(12) United States Patent
Takahashi et al.

(10) Patent No.: US 12,074,319 B2
(45) Date of Patent: Aug. 27, 2024

(54) NEGATIVE ELECTRODE ACTIVE MATERIAL FOR NON-AQUEOUS ELECTROLYTE SECONDARY BATTERY, NON-AQUEOUS ELECTROLYTE SECONDARY BATTERY, AND METHOD FOR PRODUCING NEGATIVE ELECTRODE MATERIAL FOR NON-AQUEOUS ELECTROLYTE SECONDARY BATTERY

(71) Applicant: SHIN-ETSU CHEMICAL CO., LTD., Tokyo (JP)

(72) Inventors: Kohta Takahashi, Takasaki (JP); Yusuke Osawa, Annaka (JP); Takakazu Hirose, Annaka (JP); Yoshiyasu Yamada, Tomioka (JP); Takumi Matsuno, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 547 days.

(21) Appl. No.: 17/421,522

(22) PCT Filed: Dec. 26, 2019

(86) PCT No.: PCT/JP2019/051049
§ 371 (c)(1),
(2) Date: Jul. 8, 2021

(87) PCT Pub. No.: WO2020/149133
PCT Pub. Date: Jul. 23, 2020

(65) Prior Publication Data
US 2022/0069297 A1    Mar. 3, 2022

(30) Foreign Application Priority Data
Jan. 16, 2019  (JP) ................................ 2019-005012

(51) Int. Cl.
*H01M 4/133*  (2010.01)
*C01B 33/113*  (2006.01)
(Continued)

(52) U.S. Cl.
CPC ............ *H01M 4/386* (2013.01); *C01B 33/113* (2013.01); *H01M 4/131* (2013.01); *H01M 4/133* (2013.01);
(Continued)

(58) Field of Classification Search
CPC ...... H01M 4/386; H01M 4/131; H01M 4/133; H01M 4/1391; H01M 4/1393; H01M 10/0525
See application file for complete search history.

(56) References Cited

U.S. PATENT DOCUMENTS

2011/0244334 A1  10/2011 Kawada
2018/0287140 A1  10/2018 Akira et al.
(Continued)

FOREIGN PATENT DOCUMENTS

CN  109155408 A  1/2019
CN  109155409 A  1/2019
(Continued)

OTHER PUBLICATIONS

Lee et al. (Journal of the Korean Institute of Electrical and Electronic Material Engineers vol. 32 Issue 1, pp. 78-85, 2019 (published Jan. 1, 2019)).*
(Continued)

*Primary Examiner* — Olatunji A Godo
(74) *Attorney, Agent, or Firm* — Oliff PLC

(57) ABSTRACT

The inventive negative electrode active material for a non-aqueous electrolyte secondary battery contains negative electrode active material particles which include silicon compound ($SiO_x$: $0.5 \le x \le 1.6$) particles. The negative elec-
(Continued)

trode active material particles are at least partially coated with a carbon material, contain one or more selected from $Li_2SiO_3$ and $Li_2Si_2O_5$, and satisfy $Ib/Ia \leq 4.8$ and $Ic/Ia \leq 6.0$ in an X-ray diffraction measurement using a Cu-Kα line. Ia represents an intensity of a peak around $2\theta=28.4°$ attributable to Si obtained by the X-ray diffraction. Ib represents a peak intensity of a peak attributable to $Li_2SiO_3$ obtained by the X-ray diffraction. Ic represents a peak intensity of a peak attributable to $Li_2Si_2O_5$ obtained by the X-ray diffraction. Thus, the present invention provides a negative electrode active material for a non-aqueous electrolyte secondary battery, which is stable over a long period even in an aqueous slurry and enables high capacity, favorable cycle characteristics and first-time efficiency.

16 Claims, 2 Drawing Sheets

(51) Int. Cl.
*H01M 4/131* (2010.01)
*H01M 4/1391* (2010.01)
*H01M 4/1393* (2010.01)
*H01M 4/38* (2006.01)
*H01M 10/0525* (2010.01)
*H01M 4/02* (2006.01)

(52) U.S. Cl.
CPC ....... *H01M 4/1391* (2013.01); *H01M 4/1393* (2013.01); *H01M 10/0525* (2013.01); *C01P 2002/74* (2013.01); *H01M 2004/027* (2013.01)

(56) References Cited

U.S. PATENT DOCUMENTS

| 2019/0123344 A1 | 4/2019 | Hirose et al. |
| 2019/0131618 A1 | 5/2019 | Hirose et al. |
| 2019/0157663 A1 | 5/2019 | Hirose et al. |
| 2022/0109148 A1 | 4/2022 | Osawa et al. |

FOREIGN PATENT DOCUMENTS

| CN | 113366672 A | 9/2021 |
| JP | 2011-222153 A | 11/2011 |
| JP | 2015-153520 A | 8/2015 |
| TW | 201810778 A | 3/2018 |
| WO | 2012/132387 A1 | 10/2012 |
| WO | 2017/051500 A1 | 3/2017 |
| WO | 2017/208624 A1 | 12/2017 |
| WO | 2017/208625 A1 | 12/2017 |
| WO | 2017/208627 A1 | 12/2017 |

OTHER PUBLICATIONS

Nov. 16, 2021 Office Action issued in Japanese Patent Application 2019-005012.
Jun. 16, 2021 International Preliminary Report on Patentability issued in International Patent Application No. PCT/JP2019/051049.
Dec. 4, 2023 Office Action and Search Report issued in Taiwanese Patent Application No. 109100553.
Nov. 24, 2023, Office Action issued in Chinese Patent Application No. 201980088922.3.
Mar. 17, 2020 Search Report issued in International Patent Application No. PCT/JP2019/051049.
Sep. 13, 2022 Extended European Search Report issued in European Patent Application No. 19909913.6.

* cited by examiner

[FIG. 1]
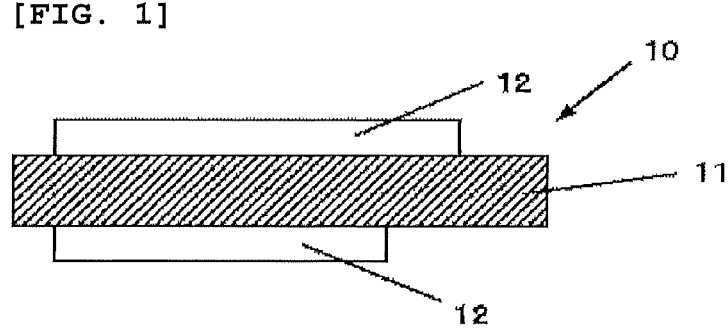
[FIG. 2]
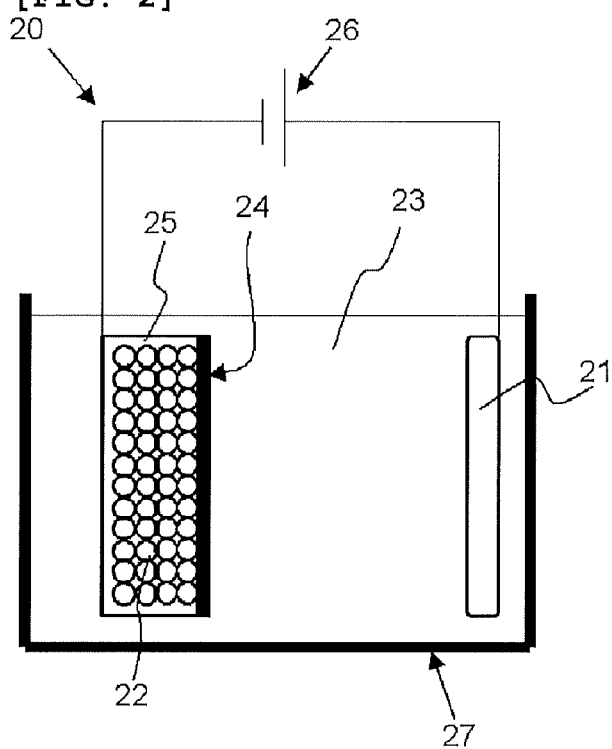

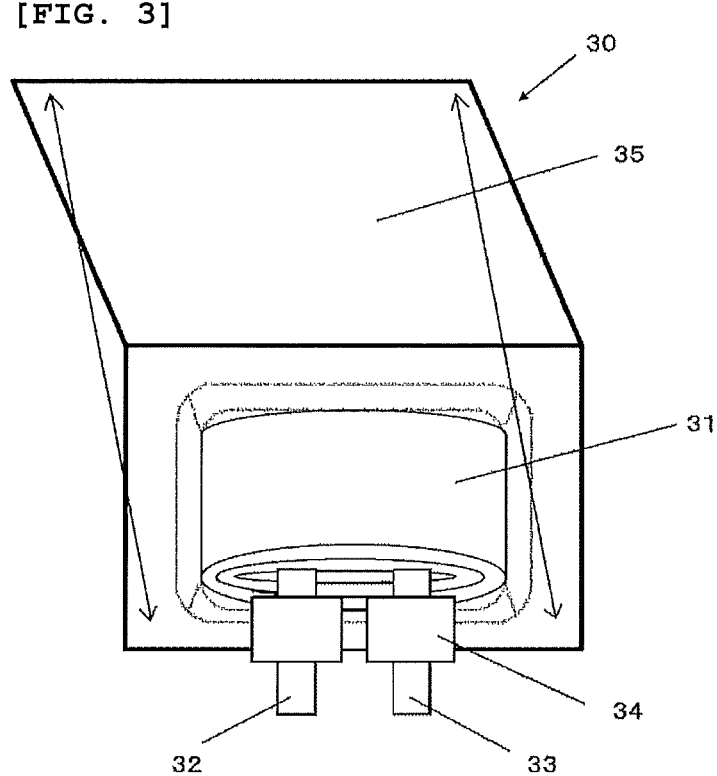

NEGATIVE ELECTRODE ACTIVE MATERIAL FOR NON-AQUEOUS ELECTROLYTE SECONDARY BATTERY, NON-AQUEOUS ELECTROLYTE SECONDARY BATTERY, AND METHOD FOR PRODUCING NEGATIVE ELECTRODE MATERIAL FOR NON-AQUEOUS ELECTROLYTE SECONDARY BATTERY

TECHNICAL FIELD

The present invention relates to a negative electrode active material for a non-aqueous electrolyte secondary battery, a non-aqueous electrolyte secondary battery, and a method for producing a negative electrode material for a non-aqueous electrolyte secondary battery.

BACKGROUND ART

In recent years, small electronic devices, represented by mobile terminals, have been widely used and urgently required to reduce the size and weight and to increase the life. Such market requirements have advanced the development of particularly small and lightweight secondary batteries with higher energy density. These secondary batteries are considered to find application not only for small electronic devices but for large electronic devices such as, typically, automobiles as well as power storage systems such as, typically, houses.

Among those, lithium-ion secondary batteries are easy to reduce the size and increase the capacity, and have higher energy density than that of lead or nickel-cadmium batteries, receiving considerable attention.

The lithium-ion secondary battery has positive and negative electrodes, a separator, and an electrolyte. The negative electrode includes a negative electrode active material related to charging and discharging reactions.

A negative electrode active material, which is usually made of a carbon material (carbon-based active material), is required to further improve the battery capacity for recent market requirement. Use of silicon as a negative electrode active material is considered to improve the battery capacity, for silicon has a theoretical capacity (4199 mAh/g) ten times or more larger than does graphite (372 mAh/g). Such a material is thus expected to significantly improve the battery capacity. The development of silicon materials for use as negative electrode active materials includes not only silicon as a simple but also alloy thereof and a compound thereof such as typically oxides. The consideration of active material shapes ranges from an application type, which is standard for carbon materials (carbon-based active materials), to an integrated type in which the materials are directly accumulated on a current collector.

Use of silicon as a main material of a negative electrode active material, however, expands and shrinks the negative electrode active material when charging or discharging, thereby making the negative electrode active material easy to break particularly near its surface layer. In addition, this negative electrode active material produces ionic substances in its interior and is thus easy to break. The breakage of the surface layer of the negative electrode active material creates a new surface, increasing a reaction area of the active material. The new surface then causes the decomposition reaction of an electrolyte and is coated with a decomposition product of the electrolyte, thereby consuming the electrolyte. This makes the cycle characteristics easy to reduce.

Conventionally, silicon oxide as a negative electrode active material has been doped with lithium to improve the battery initial efficiency and cycle characteristics (see, for example, Patent Document 1 below). When silicon oxide as a negative electrode active material incorporated with lithium is used to prepare a negative electrode, this enables less irreversible component, so that improvement in the initial efficiency can be expected. This improvement in the initial efficiency is expected to increase the capacity of the lithium-ion secondary battery. However, this silicon compound in the lithium compound dissolves in water, exhibiting basicity. Consequently, the reaction with the silicon compound causes hydrogen gas generation. This brings about problems of coating failure when such a negative electrode active material is used to prepare an aqueous slurry, and degradation of battery characteristics.

Against these, methods have been developed to keep the stability of such a negative electrode active material with silicon oxide in an aqueous slurry. For example, there have been proposed a method in which surface treatment is performed after lithium doping (for example, Patent Document 2 below), and a method in which lithium silicate stable in water is formed (for example, Patent Document 3 below).

CITATION LIST

Patent Literature

Patent Document 1: JP 2011-222153 A
Patent Document 2: WO 2017/051500 A1
Patent Document 3: JP 2015-153520 A

SUMMARY OF INVENTION

Technical Problem

However, with reference to Examples of Patent Document 3 disclosing the method of forming lithium silicate, after lithium doping to obtain target lithium silicate, washing with acidic aqueous solution is performed, and this acid washing even removes the doped lithium in such an amount that the stability in water is accomplished therewith. Consequently, silicon oxide is doped with only a limited amount of lithium. This results in a problem that the battery characteristics are improved only to limited extent.

The present invention has been made in view of the above problems. An object of the present invention is to provide a negative electrode active material for a non-aqueous electrolyte secondary battery, which exhibits high stability even in an aqueous slurry and enables excellent battery characteristics (initial efficiency and capacity retention rate). Another object of the present invention is to provide a method for producing a negative electrode material that exhibits high stability even in an aqueous slurry and enables excellent battery characteristics (initial efficiency and capacity retention rate).

Solution to Problem

To achieve the object, the present invention provides a negative electrode active material for a non-aqueous electrolyte secondary battery, containing negative electrode active material particles which comprise particles of a silicon compound ($SiO_x$: $0.5 \leq x \leq 1.6$), wherein
the negative electrode active material particles are at least partially coated with a carbon material, and comprise one or more selected from $Li_2SiO_3$ and $Li_2Si_2O_5$, and the negative electrode active material particles satisfy Ib/Ia≤4.8 and Ic/Ia≤6.0 in an X-ray diffraction measurement using a Cu-Kα line, where Ia represents an intensity of a peak around 2θ=28.4° attributable to Si obtained by the X-ray diffraction, Ib represents a peak intensity of a peak attributable to $Li_2SiO_3$ obtained by the X-ray diffraction, and Ic represents a peak intensity of a peak attributable to $Li_2Si_2O_5$ obtained by the X-ray diffraction.

Since the inventive negative electrode active material contains negative electrode active material particles including silicon compound particles, this enables the battery to have high capacity. Moreover, in the silicon compound, $SiO_2$ component, which becomes unstable by insertion and release of lithium in charging and discharging of a battery, is modified to another Li compound(s) in advance. Thus, the irreversible capacity generated in charging can be reduced. Further, since the negative electrode active material particles include a carbon coating, appropriate electric conductivity is imparted, and the capacity retention rate and initial efficiency can be improved. Furthermore, the negative electrode active material particles contain one or more silicates selected from $Li_2SiO_3$ and $Li_2Si_2O_5$, which are stable lithium compounds in water. This makes it possible to maintain the stable state without generating gas in an aqueous slurry, and consequently to improve the initial efficiency and the capacity retention rate. The above-described effects can also be exhibited as the negative electrode active material particles satisfy Ib/Ia≤4.8 and Ic/Ia≤6.0 in an X-ray diffraction using a Cu-Kα line, where Ia represents an intensity of a peak around 2θ=28.4° attributable to Si obtained by the X-ray diffraction, Ib represents a peak intensity of a peak attributable to $Li_2SiO_3$ obtained by the X-ray diffraction, and Ic represents a peak intensity of a peak attributable to $Li_2Si_2O_5$ obtained by the X-ray diffraction. If the intensity ratio Ib/Ia is higher than 4.8, a gas is generated in an aqueous slurry, so that the slurry stability cannot be guaranteed. If the intensity ratio Ic/Ia is higher than 6.0, disproportionation of the silicon compound proceeds. This consequently leads to low battery characteristics. Incidentally, hereinafter, negative electrode active material particles including silicon compound particles are also referred to as silicon-based active material particles. Additionally, negative electrode active material containing the silicon-based active material particles is also referred to as silicon-based active material.

Preferably, in this case, the peak attributable to $Li_2SiO_3$ has a half-value width of 1.0° or less, and the peak attributable to $Li_2Si_2O_5$ has a half-value width of 1.6° or less.

When the peak half-value widths attributable to $Li_2SiO_3$ and $Li_2Si_2O_5$ crystal faces are respectively 1.0° or less and 1.6° or less which are obtained in an X-ray diffraction as described above, elution of alkali components into an aqueous slurry can be suppressed, and more favorable battery characteristics are obtained.

More preferably, the negative electrode active material particles have at least one or more peaks in regions given as chemical shift values of −70 to −80 ppm and −85 to −100 ppm, which are obtained from a $^{29}Si$-MAS-NMR spectrum of the negative electrode active material particles.

In the $^{29}Si$-MAS-NMR spectrum measurement of the inventive negative electrode active material particles, a peak around −70 to −80 ppm as a chemical shift value is derived from $Li_2SiO_3$ component, and a peak around −85 to −100 ppm is derived from $Li_2Si_2O_5$ component. With a NMR peak(s) appearing in the regions, elution of alkali components into an aqueous slurry can be suppressed, and more favorable battery characteristics are obtained.

Preferably, in this case, in the $^{29}Si$-MAS-NMR spectrum of the negative electrode active material particles, the peak obtained in the region, as the chemical shift value, of −70 to −80 ppm has a peak half-value width of 1.5 ppm or less, and the peak obtained in the region of −85 to −100 ppm has a peak half-value width of 1.7 ppm or less.

The negative electrode active material particles (silicon-based active material particles) having such NMR peak(s) can suppress elution of alkali components into an aqueous slurry, and more favorable battery characteristics are obtained.

More preferably, a peak intensity ratio Ik/Ij obtained from the $^{29}Si$-MAS-NMR spectrum of the negative electrode active material particles satisfies Ik/Ij≤0.3, where Ij represents a peak intensity of the peak obtained in the region as the chemical shift value of −70 to −80 ppm, and Ik represents a peak intensity of the peak obtained in the region as the chemical shift value of 85 to −100 ppm.

The negative electrode active material particles (silicon-based active material particles) having such NMR peak(s) can suppress elution of alkali components into an aqueous slurry, and more favorable battery characteristics are obtained.

Further preferably, in the inventive negative electrode active material for a non-aqueous electrolyte secondary battery, the negative electrode active material particles are coated with the carbon material in an amount of 0.5 mass % or more and 15 mass % or less relative to a total of the silicon compound particles and the carbon material.

When the carbon-coating amount on the negative electrode active material particles is 0.5 mass % or more and 15 mass % or less as described above, sufficient electric conductivity can be guaranteed, so that more favorable battery characteristics are obtained.

Furthermore preferably, an intensity ratio Id/Ig of a D band and a G band in Raman spectrometry of the negative electrode active material particles satisfies 0.4≤Id/Ig≤1.

In this manner, with the intensity ratio Id/Ig of 0.4≤Id/Ig≤1, it is possible to suppress separation of the carbon film due to expansion and shrinkage as well as side reaction on the carbon surface, so that more favorable battery characteristics are obtained.

Furthermore preferably, an intensity ratio ISi/Ig of a Si peak intensity and a G band in Raman spectrometry of the negative electrode active material particles satisfies 0≤ISi/Ig≤1.

In this manner, with the intensity ratio ISi/Ig of 0≤ISi/Ig≤1, it is possible to suppress the surface exposure of the silicon compound particles, and delay gas generation in the aqueous slurry. Consequently, more favorable battery characteristics are obtained.

Furthermore, the silicon compound particles preferably have a median diameter (based on volume) of 0.5 µm or more and 20 µm or less.

When the median diameter of the silicon compound particles is 0.5 µm or more as described above, side reaction occurs in a smaller area on the surface of the silicon compound particles, so that the battery can keep the cycle retention rate high without excessively consuming Li. Meanwhile, when the median diameter of the silicon compound particles is 20 µm or less, the silicon compound particles expand less during the Li insertion and are hard to break and to form crack. Further, since the silicon compound expansion is small, for example, a negative electrode active material layer and the like in which a commonly used silicon-based active material is mixed with a carbon active material become hard to break.

In addition, the present invention provides a non-aqueous electrolyte secondary battery comprising any of the above-described negative electrode active materials for a non-aqueous electrolyte secondary battery.

Such a secondary battery has high cycle retention rate and first-time efficiency, and can be produced industrially advantageously.

Furthermore, the present invention provides a method for producing a negative electrode material for a non-aqueous electrolyte secondary battery containing negative electrode active material particles, the method comprising steps of:
preparing silicon compound particles each containing a silicon compound ($SiO_x$: $0.5 \leq x \leq 1.6$);
coating at least part of the silicon compound particles with a carbon material;
inserting Li into the silicon compound particles to incorporate one or more selected from $Li_2SiO_3$ and $Li_2Si_2O_5$ into the silicon compound particles so as to prepare the negative electrode active material particles; and
further selecting, from the prepared negative electrode active material particles subjected to an X-ray diffraction measurement using a Cu-Kα line, such negative electrode active material particles satisfying Ib/Ia≤4.8 and Ic/Ia≤6.0, where
Ia represents an intensity of a peak around 2θ=28.4° attributable to Si obtained by the X-ray diffraction,
Ib represents a peak intensity of a peak attributable to $Li_2SiO_3$ obtained by the X-ray diffraction, and
Ic represents a peak intensity of a peak attributable to $Li_2Si_2O_5$ obtained by the X-ray diffraction,
wherein the selected negative electrode active material particles are used to produce a negative electrode material for a non-aqueous electrolyte secondary battery.

Such a method for producing a negative electrode material for a non-aqueous electrolyte secondary battery makes it possible to obtain a non-aqueous negative electrode material having high battery capacity and favorable cycle retention rate, which reflect intrinsic characteristics of silicon oxide modified with Li.

Advantageous Effects of Invention

The inventive negative electrode active material is capable of improving the stability of slurry prepared in producing a secondary battery. The use of this slurry enables formation of industrially-utilizable coating film, thereby substantially improving the battery capacity, cycle characteristics, and first time charge-discharge characteristics. Moreover, the inventive secondary battery containing this negative electrode active material can be produced industrially advantageously, and has favorable battery capacity, cycle characteristics, and first time charge-discharge characteristics. Further, the same effects can be attained also from an electronic device, a machine tool, an electric vehicle, a power storage system, etc. which use the inventive secondary battery.

The inventive method for producing a negative electrode material makes it possible to produce a negative electrode material which is capable of improving not only the stability of slurry prepared in producing a secondary battery, but also the battery capacity, cycle characteristics, and first time charge-discharge characteristics.

BRIEF DESCRIPTION OF DRAWINGS

FIG. 1 is a sectional view showing a configuration example of a negative electrode for a non-aqueous electrolyte secondary battery, which contain the inventive negative electrode active material.

FIG. 2 shows a bulk modification apparatus usable in producing the inventive negative electrode active material.

FIG. 3 is an exploded diagram showing a configuration example (laminate film type) of a lithium-ion secondary battery that contains the inventive negative electrode active material.

DESCRIPTION OF EMBODIMENTS

Hereinafter, embodiments of the present invention will be described, but the present invention is not limited thereto.

As described above, as a technique to increase the battery capacity of lithium-ion secondary battery, there has been investigated the use of a negative electrode mainly made from a silicon-based active material as a negative electrode for lithium-ion secondary battery. Such a lithium-ion secondary battery mainly made from a silicon-based active material is desired to have initial efficiency and cycle characteristics almost equivalent to those of a lithium-ion secondary battery using a carbon material (carbon-based negative electrode active material). However, no negative electrode material has been proposed which exhibits cycle stability equivalent to that of a non-aqueous electrolyte secondary battery using a carbon material. In addition, particularly a silicon compound containing oxygen exhibits low initial efficiency in comparison with that exhibited with carbon material, so that the improvement in the battery capacity has been limited by this low initial efficiency.

Accordingly, the present inventors have diligently investigated to obtain a negative electrode active material that can easily produce a non-aqueous electrolyte secondary battery having high battery capacity, favorable cycle characteristics, and favorable initial efficiency; thereby, providing the present invention.

[Inventive Negative Electrode Active Material] A negative electrode active material for a non-aqueous electrolyte secondary battery according to the present invention contains negative electrode active material particles. Moreover, the negative electrode active material particles include particles of a silicon compound ($SiO_x$: $0.5 \leq x \leq 1.6$). Further, the negative electrode active material particles (silicon-based active material particles) are at least partially coated with a carbon material. Additionally, the negative electrode active material particles (silicon-based active material particles) contain one or more selected from $Li_2SiO_3$ and $Li_2Si_2O_5$. Further, the negative electrode active material particles satisfy Ib/Ia≤4.8 and Ic/Ia≤6.0 in an X-ray diffraction measurement using a Cu-Kα line, where Ia represents an intensity of a peak around 2θ=28.4° attributable to Si obtained by the X-ray diffraction, Ib represents a peak intensity of a peak attributable to $Li_2SiO_3$ obtained by the X-ray diffraction, and Ic represents a peak intensity of a peak attributable to $Li_2Si_2O_5$ obtained by the X-ray diffraction.

Such a negative electrode active material makes a battery have high capacity because negative electrode active material particles including silicon compound are incorporated. Moreover, in the silicon compound, the $SiO_2$ component, which otherwise becomes unstable by inserting and releasing lithium in charging or discharging a battery, is modified in advance to another Li compound(s). This makes it possible to reduce irreversible capacity generated in charging. Further, providing the carbon coating on the negative electrode active material particles imparts appropriate electric conductivity, and can improve the capacity retention rate and initial efficiency. Furthermore, the negative electrode active material particles contain one or more silicates selected from $Li_2SiO_3$ and $Li_2Si_2O_5$, which are stable lithium compounds in water. Thus, the stable state can be kept without gas generation in an aqueous slurry, consequently leading to improvements in the initial efficiency and capacity retention rate. In addition, the negative electrode active material particles satisfy Ib/Ia≤4.8 and Ic/Ia≤6.0 in an X-ray diffraction using a Cu-Kα line, where Ia represents an intensity of a peak around 2θ=28.4° attributable to Si obtained by the X-ray diffraction, Ib represents a peak intensity of a peak attributable to $Li_2SiO_3$ obtained by the X-ray diffraction, and Ic represents a peak intensity of a peak attributable to $Li_2Si_2O_5$ obtained by the X-ray diffraction. Thereby, the above-described effects are successfully exhibited. If the intensity ratio Ib/Ia is larger than 4.8, gas is generated in an aqueous slurry, so that the slurry stability cannot be guaranteed. If the intensity ratio Ic/Ia is larger than 6, disproportionation of the silicon compound proceeds, and may result in low battery characteristics.

More preferably, Ib/Ia satisfies 0≤Ib/Ia 4.0, and Ic/Ia satisfies 0≤Ic/Ia≤5.1. When the intensity ratios Ib/Ia and Ic/Ia are within these ranges, more favorable battery characteristics can be obtained.

[Configuration of Negative Electrode]

Next, description will be given of a configuration of a negative electrode of a secondary battery, which contains the inventive negative electrode active material as described above.

FIG. 1 shows a sectional view of a negative electrode containing the inventive negative electrode active material. As shown in FIG. 1, a negative electrode 10 is constituted to have a negative electrode active material layer 12 on a negative electrode current collector 11. The negative electrode active material layer 12 may be disposed on both sides or only one side of the negative electrode current collector 11. Furthermore, as long as the inventive negative electrode active material is used, the negative electrode current collector 11 is not essential.

[Negative Electrode Current Collector]

The negative electrode current collector 11 is made of a highly electric conductive and mechanically strong material. Examples of the electric conductive material usable for the negative electrode current collector 11 include copper (Cu) and nickel (Ni). This electric conductive material is preferably a material that does not form an intermetallic compound with lithium (Li).

The negative electrode current collector 11 preferably contains carbon (C) and sulfur (S) besides the main element because these elements improve the physical strength of the negative electrode current collector. In particular, when an active material layer that expands in charging is disposed, the current collector containing the above elements has an effect of suppressing deformation of the electrode including the current collector. The content of the contained elements is not particularly limited, but is preferably 100 ppm or less. This is because a higher effect of suppressing deformation is obtained.

Additionally, the surface of the negative electrode current collector 11 may or may not be roughened. Examples of the roughened negative electrode current collector include a metallic foil subjected to an electrolyzing process, embossing process, or chemical etching process; etc. Examples of the negative electrode current collector that is not roughened include a rolled metallic foil, etc.

[Negative Electrode Active Material Layer]

The negative electrode active material layer 12 may contain multiple types of negative electrode active materials, such as carbon-based active material, besides the silicon-based active material particles. Depending on battery design, other materials may be further contained, such as a thickener (also referred to as "binding agent", "binder"), a conductive assistant agent, etc. Additionally, the form of the negative electrode active material may be particle.

Further, the inventive negative electrode active material contains silicon-based active material particles of $SiO_x$ (0.5≤x≤1.6) as described above. The silicon-based active material particles are each a silicon oxide material ($SiO_x$: 0.5≤x≤1.6). In this composition, "x" is preferably close to 1 because higher cycle characteristics are obtained. Note that the composition of the silicon oxide material in the present invention does not necessarily mean purity of 100%, and may contain a small quantity of impurity elements and Li.

Additionally, in the present invention, the silicon compound becomes more favorable as the crystallinity is lower. In other words, desirably, the silicon-based active material has a diffraction peak attributable to a Si(111) crystal face obtained from an X-ray diffraction using a Cu-Kα line, the diffraction peak has a half-value width of 1.5° or more, and the crystallite size attributable thereto is 7.5 nm or less. Particularly preferably, the diffraction peak is a broad or indistinctive peak. In this case, neither the half-value width nor the crystallite size can be calculated. Hence, it can be regarded as substantially amorphous material. Particularly, when the crystallinity and the Si crystal content are so low as described above, these not only improve the battery characteristics but also enable formation of stable Li compound.

Moreover, the median diameter of the silicon compound particles is not particularly limited, but is especially preferably 0.5 μm or more and 20 μm or less (based on volume). With this range, lithium ions are easily occluded and released in charging and discharging, and the silicon-based active material particles become less liable to break. When the median diameter is 0.5 μm or more, the surface area is so large that side reaction hardly occurs in charging or discharging, and the irreversible battery capacity can be reduced. Meanwhile, when the median diameter is 20 μm or less, the expansion during Li insertion is small, and it is hard to break the particles and to form a crack. Specifically, the silicon-based active material particles are less liable to break, thereby being prevented from forming a new surface. Thus, such diameters are preferable. Further, since the expansion of the silicon compound is small, for example, a negative electrode active material layer and the like in which a commonly used silicon-based active material is mixed with a carbon active material become hard to break.

Furthermore, in the inventive negative electrode active material, the silicon compound particles contain one or more selected from $Li_2SiO_3$ and $Li_2Si_2O_5$. Since these Li silicates are relatively more stable than other Li compounds, the silicon-based active material containing such Li compound(s) can exhibit more stable battery characteristics. These Li compounds can be obtained by selectively changing a part of $SiO_2$ component formed inside the silicon compound to a Li compound to thus modify the silicon compound. Additionally, in a silicon compound, $SiO_2$ component becomes unstable upon insertion and release of lithium when a battery is charged and discharged. Thus, such component is modified to other lithium silicates in advance, so that the irreversible capacity generated in charging can be reduced. Other than these, the inventive negative electrode active material may contain $Li_6Si_2O_7$, $Li_4SiO_4$, or the like as Li silicate.

Note that these lithium silicates can be quantified by NMR (Nuclear Magnetic Resonance) or XPS (X-ray photoelectron spectroscopy). The XPS and NMR measurements can be performed under the following conditions, for example.

XPS
- Apparatus: an X-ray photoelectron spectrometer,
- X-ray Source: a monochromatic Al Kα line,
- X-ray Spot Diameter: 100 μm,
- Ar-ion Gun Sputtering Conditions: 0.5 kV/2 mm×2 mm.

$^{29}$Si MAS NMR (Magic Angle Spinning-Nuclear Magnetic Resonance)
- Apparatus: a 700-NMR spectroscope made by Bruker Corp.,
- Probe: a 4-mm HR-MAS rotor, 50 μL,
- Sample Spinning Speed: 10 kHz,
- Measurement Environment Temperature: 25° C.

More preferably, in the present invention, a peak attributable to $Li_2SiO_3$ has a half-value width of 1.0° or less, and a peak attributable to $Li_2Si_2O_5$ has a half-value width of 1.6° or less. Accordingly, elution of alkali components into an aqueous slurry can be suppressed, and more favorable battery characteristics are obtained.

More preferably, the inventive negative electrode active material particles have at least one or more peaks in regions given as chemical shift values of −70 to −80 ppm and −85 to −100 ppm, which are obtained from a $^{29}$Si-MAS-NMR spectrum of the inventive negative electrode active material particles. In the $^{29}$Si-MAS-NMR spectrum measurement of the inventive negative electrode active material particles, a peak around −70 to −80 ppm as a chemical shift value is derived from $Li_2SiO_3$ component, and a peak around −85 to −100 ppm is derived from $Li_2Si_2O_5$ component. With a NMR peak(s) in the regions, elution of alkali components into an aqueous slurry can be suppressed, and more favorable battery characteristics are obtained.

Moreover, in the $^{29}$Si-MAS-NMR spectrum of the inventive negative electrode active material particles, the peak obtained in the region, as a chemical shift value, of −70 to −80 ppm (i.e., peak derived from $Li_2SiO_3$ component) preferably has a peak half-value width of 1.5 ppm or less. Further, in the $^{29}$Si-MAS-NMR spectrum of the inventive negative electrode active material particles, the peak obtained in the region, as a chemical shift value, of 85 to −100 ppm (i.e., peak derived from $Li_2Si_2O_5$ component) preferably has a peak half-value width of 1.7 ppm or less. The negative electrode active material particles (silicon-based active material particles) with such NMR peak(s) can suppress elution of alkali components into an aqueous slurry, and more favorable battery characteristics are obtained.

More preferably, a peak intensity ratio Ik/Ij obtained from the $^{29}$Si-MAS-NMR spectrum of the inventive negative electrode active material particles satisfies Ik/Ij≤0.3, where Ij represents a peak intensity of the peak obtained in the region as the chemical shift value of −70 to −80 ppm (i.e., peak derived from $Li_2SiO_3$ component), and Ik represents a peak intensity of the peak obtained in the region as the chemical shift value of 85 to −100 ppm (i.e., peak derived from $Li_2Si_2O_5$ component). The negative electrode active material particles (silicon-based active material particles) with such NMR peak(s) can suppress elution of alkali components into an aqueous slurry, and more favorable battery characteristics are obtained.

Further preferably, in the inventive negative electrode active material for a non-aqueous electrolyte secondary battery, the negative electrode active material particles are coated with the carbon material in an amount of 0.5 mass % or more and 15 mass % or less relative to a total of the silicon compound particles and the carbon material. When the amount of the carbon coating on the negative electrode active material particles is 0.5 mass % or more and 15 mass % or less as described above, it is possible to guarantee sufficient electric conductivity, so that more favorable battery characteristics are obtained.

Furthermore preferably, an intensity ratio Id/Ig of a D band and a G band in Raman spectrometry of the inventive negative electrode active material particles satisfies 0.4≤Id/Ig≤1. When the intensity ratio Id/Ig is within such a range, separation of the carbon film due to expansion/shrinkage and side reaction on the carbon surface can be suppressed, so that more favorable battery characteristics are obtained.

Furthermore preferably, an intensity ratio ISi/Ig of a Si peak intensity and the G band in Raman spectrometry of the inventive negative electrode active material particles satisfies 0≤ISi/Ig 1. When the intensity ratio ISi/Ig is 0≤ISi/Ig≤1 in this manner, the exposure of the silicon compound particles from their surfaces can be suppressed, and gas generation in the aqueous slurry can be delayed. Consequently, more favorable battery characteristics are obtained.

Furthermore, in the present invention, when the silicon compound particles are to be modified, it is possible to employ methods, such as an electrochemical method, modification by oxidation-reduction reaction, and thermal doping, which is a physical method. Particularly, the negative electrode active material is improved in relation to battery characteristics when the silicon compound particles are modified by employing an electrochemical method and modification by oxidation and reduction. Moreover, the modification is preferably performed by not only inserting Li into the silicon compound particles but also stabilizing the Li compound particles by heating and/or releasing Li from the silicon compound particles simultaneously. Thereby, the stability, including the water resistance, of the negative electrode active material in a slurry is further improved.

Additionally, as described above, in the present invention, the silicon compound in the silicon-based active material particles includes the carbon coating on at least part of the surfaces thereof. Accordingly, appropriate electric conductivity is achieved.

[Method for Producing Negative Electrode]

Next, description will be given of an example of a method for producing a negative electrode material according to the present invention and a method for producing a negative electrode for non-aqueous electrolyte secondary battery by using the negative electrode material.

First, the method for producing a negative electrode material to be contained in a negative electrode will be described. At first, silicon compound particles containing a silicon compound ($SiO_x$: 0.5≤X≤1.6) are prepared. Next, at least part of the silicon compound particles is coated with a carbon material. Subsequently, Li is inserted into the silicon compound particles to incorporate one or more selected from $Li_2SiO_3$ and $Li_2Si_2O_5$ into the silicon compound particles. Thereby, negative electrode active material particles are prepared. The inventive method for producing a negative electrode material for a non-aqueous electrolyte secondary battery further includes a step of selecting negative electrode active material particles satisfying particular requirements from the negative electrode active material particles prepared as described above. The particular requirements to be satisfied are Ib/Ia≤4.8 and Ic/Ia≤6.0, which are recognized when the negative electrode active material particles are subjected to an X-ray diffraction measurement using a Cu-Kα line. Ia represents an intensity of a peak around 2θ=28.4° attributable to Si obtained by the X-ray diffraction. Ib represents a peak intensity of a peak attributable to $Li_2SiO_3$ obtained by the X-ray diffraction. Ic represents a peak intensity of a peak attributable to $Li_2Si_2O_5$ obtained by the X-ray diffraction. The negative electrode active material particles selected in this manner are used to produce a negative electrode material for a non-aqueous electrolyte secondary battery.

More specifically, the negative electrode material is produced, for example, by the following procedure.

First, in order to prepare silicon compound particles containing a silicon compound including a silicon compound ($SiO_x$: 0.5≤X≤1.6), a raw material which generates silicon oxide gas is heated in the presence of inert gas or under reduced pressure in a temperature range of 900° C. to 1600° C. to generate silicon oxide gas. In this case, the raw material is a mixture of metallic silicon powder with silicon dioxide powder. In consideration of the existence of oxygen on the surface of the metallic silicon powder and slight oxygen in a reaction furnace, the mixing mole ratio is desirably in a range of 0.8<metallic silicon powder/silicon dioxide powder<1.3. The Si crystallites in the particles are controlled by changing the charging range or the evaporation temperature, or by a heat treatment after the preparation. The generated gas is deposited on an adsorption plate. While the temperature inside the reaction furnace is lowered to 100° C. or less, the deposit is taken out, ground, and powdered using a ball mil, a jet mil, or the like.

Next, at least part of the obtained powder material (silicon compound particles) is coated with a carbon material. The carbon coating effectively further improves the battery characteristics of the negative electrode active material.

As a method for forming the carbon coating on the surface layer of the powder material, thermal decomposition CVD is desirable. In the thermal decomposition CVD, the silicon oxide powder is set in a furnace, the furnace is filled with a hydrocarbon gas, and the temperature in the furnace is raised. The pyrolysis temperature is particularly preferably, but not particularly limited to, 1200° C. or less, more preferably 950° C. or less. Thereby, unintentional disproportionation of the silicon oxide can be suppressed. The hydrocarbon gas is not particularly limited, but preferably has a composition of $C_nH_m$ where 3≥n. This is because of low production cost and favorable properties of the decomposition products.

Next, Li is inserted into the silicon compound particles prepared as described above, so that the silicon compound particles include one or more selected from $Li_2SiO_3$ and $Li_2Si_2O_5$. Li is preferably inserted by an electrochemical method or an oxidation-reduction method.

In the modification by the electrochemical method, the apparatus structure is not particularly limited. For example, a bulk modification apparatus 20 shown in FIG. 2 can be used to perform bulk modification. The bulk modification apparatus 20 has: a bath 27 filled with an organic solvent 23; a positive electrode (lithium source, modification source) 21 disposed in the bath 27 and connected to one terminal of a power source 26; a powder storage container 25 disposed in the bath 27 and connected to the other terminal of the power source 26; and a separator 24 provided between the positive electrode 21 and the powder storage container 25. Silicon compound particles (silicon oxide powder) 22 are stored in the powder storage container 25. After the silicon compound particles are stored in the powder storage container 25, the power source applies voltage between the powder storage container 25 storing the silicon compound particles and the positive electrode (lithium source) 21. Thereby, lithium can be inserted into or released from the silicon compound particles so that the silicon compound particles 22 can be modified. Heating the resulting silicon compound particles at 400 to 800° C. can stabilize the Li compound.

As the organic solvent 23 in the bath 27, it is possible to use ethylene carbonate, propylene carbonate, dimethyl carbonate, diethyl carbonate, ethylmethyl carbonate, fluoromethylmethyl carbonate, difluoromethylmethyl carbonate, etc. Moreover, as an electrolyte salt contained in the organic solvent 23, it is possible to use lithium hexafluorophosphate ($LiPF_6$), lithium tetrafluoroborate ($LiBF_4$), etc.

As the positive electrode 21, a Li foil or a Li-containing compound may be used. Examples of the Li-containing compound include lithium carbonate, lithium oxide, lithium cobalt oxide, olivine iron lithium, lithium nickel oxide, lithium vanadium phosphate, etc.

After the electrochemical Li-doping modification, washing may be performed with alkaline water in which lithium carbonate, lithium oxide, or lithium hydroxide is dissolved, alcohol, weak acid, pure water, or the like. The washing allows elution of extra alkali components, and improves the slurry stability.

In the modification by the oxidation-reduction method, for example, first, lithium is dissolved in an ether-based solvent to prepare a solution A. The silicon compound particles are immersed in the solution A, so that lithium can be inserted. The solution A may further contain a polycyclic aromatic compound or a linear polyphenylene compound. The Li compound can be stabilized by heating the resulting silicon compound particles at 400 to 800° C. Additionally, after the lithium insertion, the silicon compound particles may be immersed in a solution B containing a polycyclic aromatic compound or a derivative thereof to release active lithium from the silicon compound particles. As a solvent of the solution B, for example, an ether-based solvent, a ketone-based solvent, an ester-based solvent, an alcohol-based solvent, an amine-based solvent, or a mixed solvent thereof can be used. Washing may be performed with alkaline water in which lithium carbonate, lithium oxide, or lithium hydroxide is dissolved, alcohol, weak acid, pure water, or the like. The washing allows elution of extra alkali components, and improves the slurry stability.

As the ether-based solvent used in the solution A, it is possible to use diethyl ether, tert-butyl methyl ether, tetrahydrofuran, dioxane, 1,2-dimethoxy ethane, diethylene glycol dimethyl ether, triethylene glycol dimethyl ether, tetraethylene glycol dimethyl ether, mixed solvents thereof, etc. Among these, tetrahydrofuran, dioxane, 1,2-dimethoxy ethane, and diethylene glycol dimethyl ether are particularly preferably used. These solvents are preferably dehydrated, and preferably deoxygenized.

Moreover, as the polycyclic aromatic compound contained in the solution A, it is possible to use one or more kinds of naphthalene, anthracene, phenanthrene, naphthalene, pentacene, pyrene, triphenylene, coronene, chrysene, and derivatives thereof. As the linear polyphenylene compound, it is possible to use one or more kinds of biphenyl, terphenyl, and derivatives thereof.

As the polycyclic aromatic compound contained in the solution B, it is possible to use one or more kinds of naphthalene, anthracene, phenanthrene, naphthalene, pentacene, pyrene, triphenylene, coronene, chrysene, and derivatives thereof.

Moreover, as the ether-based solvent of the solution B, it is possible to use one or more kinds of diethyl ether, tert-butyl methyl ether, tetrahydrofuran, dioxane, 1,2-dimethoxy ethane, diethylene glycol dimethyl ether, triethylene glycol dimethyl ether, tetraethylene glycol dimethyl ether, mixed solvents thereof, etc.

As the ketone-based solvent, it is possible to use acetone, acetophenine, etc.

As the ester-based solvent, it is possible to use methyl formate, methyl acetate, ethyl acetate, propyl acetate, isopropyl acetate, etc.

As the alcohol-based solvent, it is possible to use methanol, ethanol, propanol, isopropyl alcohol, etc.

As the amine-based solvent, it is possible to use methylamine, ethylamine, ethylenediamine, etc.

Alternatively, Li may be inserted into the negative electrode active material particles (silicon-based active material particles) by a thermal doping method. In this case, the modification is possible, for example, by mixing the negative electrode active material particles with LiH powder or Li powder, followed by heating under a non-oxidizing atmosphere. As the non-oxidizing atmosphere, for example, Ar atmosphere or the like can be employed. More specifically, first, under Ar atmosphere, LiH powder or Li powder is sufficiently mixed with the silicon compound (silicon oxide) powder, and sealed. The whole sealed vessel is stirred to make the mixture uniform. Then, the mixture is heated in a range of 700° C. to 750° C. for the modification. In this event, in order to release Li from the silicon compound, the heated powder may be sufficiently cooled and then washed with alkaline water in which lithium carbonate, lithium oxide, or lithium hydroxide is dissolved, alcohol, weak acid, pure water, or the like. The washing allows elution of extra alkali components, and improves the slurry stability.

<Aqueous Negative Electrode Slurry Composition>

An aqueous negative electrode slurry composition can be obtained by: optionally mixing the negative electrode active material produced as described above with other materials, such as a negative electrode binding agent and a conductive assistant agent; and then adding water (an organic solvent or the like can also be added in addition to water).

Such an aqueous negative electrode slurry composition is capable of suppressing over-time changes due to, for example, gas generation during storage. This allows the production process to be designed quite freely and industrially suitable. Moreover, when this aqueous negative electrode slurry composition is used to prepare a negative electrode, a secondary battery having high capacity and favorable initial charge-discharge characteristics is successfully obtained.

Next, the aqueous negative electrode slurry composition is applied onto the surface of a negative electrode current collector and dried to form a negative electrode active material layer. In this event, heat pressing and so on may be performed as necessary. As described above, a negative electrode is successfully produced.

<Lithium-Ion Secondary Battery>

Next, a lithium-ion secondary battery of a laminate film type will be described as a concrete example of the inventive non-aqueous electrolyte secondary battery described above.

[Configuration of Laminate Film Type Secondary Battery]

A laminate film type lithium-ion secondary battery 30 shown in FIG. 3 mainly includes a wound electrode body 31 stored in sheet-shaped outer parts 35. This wound electrode body 31 is formed by winding a positive electrode, a negative electrode, and a separator disposed between these electrodes. There is also a case storing a laminate having a separator disposed between a positive electrode and a negative electrode without winding. The electrode bodies of both types have a positive-electrode lead 32 attached to the positive electrode and a negative-electrode lead 33 attached to the negative electrode. The outermost circumference of the electrode bodies is protected by a protecting tape.

The positive-electrode lead 32 and the negative-electrode lead 33, for example, extend from the interior of the outer parts 35 toward the exterior in one direction. The positive-electrode lead 32 is made of, for example, a conductive material, such as aluminum. The negative-electrode lead 33 is made of, for example, a conductive material, such as nickel or copper.

An example of the outer part 35 is a laminate film composed of a fusion-bond layer, a metallic layer, and a surface protecting layer stacked in this order. Two laminate films are fusion-bonded or stuck with an adhesive or the like at the outer edges of their fusion-bond layers such that each fusion-bond layer faces the electrode body 31. The fusion-bond portion is for example a film, such as a polyethylene or polypropylene film. The metallic portion is aluminum foil, etc. The protecting layer is for example nylon, etc.

The space between the outer parts 35 and the positive- and negative-electrode leads is filled with close adhesion films 34 to prevent air from entering therein. Exemplary materials of the close adhesion films include polyethylene, polypropylene, and polyolefin resins.

The positive electrode has a positive electrode active material layer disposed on one side or both sides of a positive electrode current collector like the negative electrode 10 shown in FIG. 1, for example.

The positive electrode current collector is made of, for example, a conductive material, such as aluminum.

The positive electrode active material layer contains any one kind or two kinds or more of positive electrode materials capable of occluding and releasing lithium ions, and may contain a positive electrode binding agent, a positive electrode conductive assistant agent, a dispersing agent, or other materials according to design. The details of the positive electrode binding agent and the positive electrode conductive assistant agent in this case are the same as those for the negative electrode binding agent and negative electrode conductive assistant agent described above, for example.

The positive electrode material is preferably a compound containing lithium. Examples of the lithium-containing compound include complex oxides each composed of lithium and a transition metal element, and phosphate compounds each containing lithium and a transition metal element. Among these positive electrode materials, a compound containing at least one of nickel, iron, manganese, and cobalt is preferable. The chemical formula of such compounds is expressed by, for example, $Li_xM_1O_2$ or $Li_yM_2PO_4$. In the formulae, $M_1$ and $M_2$ represent at least one kind of transition metal elements. "x" and "y" each represent a value varied depending on a charging or discharging status of a battery, which typically satisfy $0.05 \le x \le 1.10$ and $0.05 \le y \le 1.10$.

Examples of the complex oxides composed of lithium and a transition metal element include a lithium cobalt complex oxide ($Li_xCoO_2$), a lithium nickel complex oxide ($Li_xNiO_2$), a lithium-nickel-cobalt complex oxide, etc. Examples of the lithium-nickel-cobalt complex oxide include lithium-nickel-cobalt-aluminum complex oxide (NCA), lithium-nickel-cobalt-manganese complex oxide (NCM), etc.

Examples of the phosphate compounds containing lithium and a transition metal element include a lithium-iron-phosphate compound (LiFePO$_4$), a lithium-iron-manganese-phosphate compound (LiFe$_{1-u}$Mn$_u$PO$_4$ (0<u<1)), etc. Higher battery capacity and excellent cycle characteristics can be obtained using these positive electrode materials.

[Negative Electrode]

The negative electrode has a configuration which is similar to that of the above negative electrode 10 for a lithium-ion secondary battery shown in FIG. 1, and, for example, has the negative electrode active material layers disposed on both faces of the current collector. The negative electrode preferably has a negative-electrode charge capacity larger than electrical capacitance (battery charge capacity) provided by the positive electrode active material. This negative electrode itself can suppress the precipitation of lithium metal thereon.

The positive electrode active material layer is formed partially on both faces of the positive electrode current collector. Similarly, the negative electrode active material layer is also formed partially on both faces of the negative electrode current collector. In this case, the negative electrode active material layer provided on the negative electrode current collector, for example, has a region which does not face any positive electrode active material layer. This intends to perform a stable battery design.

The area at which the positive and negative electrode active material layers do not face one another is hardly affected by charging and discharging. The status of the negative electrode active material layer is consequently retained since its formation. This enables repeatable high-precision investigation of, for example, the composition of negative electrode active material without being affected by charging and discharging.

[Separator]

The separator separates the positive electrode and the negative electrode, prevents short circuit current due to contact of these electrodes, and passes lithium ions therethrough. This separator may be made of, for example, a porous film of synthetic resin or ceramic, or two or more stacked porous films to give laminate structure. Examples of the synthetic resin include polytetrafluoroethylene, polypropylene, polyethylene, etc.

[Electrolyte]

At least a part of the active material layers or the separator is impregnated with a liquid electrolyte (electrolytic solution). This electrolytic solution is composed of electrolyte salt dissolved in a solvent and may contain other materials such as additives.

The solvent to be used may be, for example, a non-aqueous solvent. Examples of the non-aqueous solvent include ethylene carbonate, propylene carbonate, butylene carbonate, dimethyl carbonate, diethyl carbonate, ethylmethyl carbonate, methylpropyl carbonate, 1,2-dimethoxyethane, tetrahydrofuran, etc. Among these, at least one or more of ethylene carbonate, propylene carbonate, dimethyl carbonate, diethyl carbonate, or ethylmethyl carbonate are preferably used because such solvent(s) enable better characteristics. In this case, superior characteristics can be obtained by combined use of a high-viscosity solvent, such as ethylene carbonate or propylene carbonate, and a low-viscosity solvent, such as dimethyl carbonate, ethylmethyl carbonate, or diethyl carbonate. This is because the dissociation of electrolyte salt and ionic mobility are improved.

When an alloyed negative electrode is used, the solvent particularly preferably contains at least one of halogenated chain carbonate ester and halogenated cyclic carbonate ester. Such a solvent enables the negative electrode active material to be coated with a stable coating at charging or discharging, particularly charging. The halogenated chain carbonate ester is chain carbonate ester having halogen as a constituent element (at least one hydrogen is substituted by halogen). Moreover, the halogenated cyclic carbonate ester is cyclic carbonate ester having halogen as a constituent element (i.e., at least one hydrogen is substituted by halogen).

The kind of halogen is not particularly limited, but fluorine is preferable. This is because fluorine enables the formation of better coating than other halogens do. A larger number of halogens are better because a more stable coating can be obtained which reduces a decomposition reaction of the electrolytic solution.

Examples of the halogenated chain carbonate ester include fluoromethyl methyl carbonate, difluoromethyl methyl carbonate, etc. Examples of the halogenated cyclic carbonate ester include 4-fluoro-1,3-dioxolane-2-one, 4,5-difluoro-1,3-dioxolane-2-one, etc.

The solvent preferably contains an unsaturated carbon bond cyclic carbonate ester as an additive because this enables the formation of a stable coating on the negative electrode surface at charging and discharging and the inhibition of a decomposition reaction of the electrolytic solution. Examples of the unsaturated carbon bond cyclic carbonate ester include vinylene carbonate, vinyl ethylene carbonate, etc.

In addition, the solvent preferably contains sultone (cyclic sulfonic acid ester) as an additive because this improves chemical stability of a battery. Examples of the sultone include propane sultone and propene sultone.

In addition, the solvent preferably contains acid anhydride because this improves chemical stability of the electrolytic solution. An example of the acid anhydride includes propane disulfonic acid anhydride.

The electrolyte salt may contain, for example, at least one light metal salt, such as lithium salt. Examples of the lithium salt include lithium hexafluorophosphate (LiPF$_6$), lithium tetrafluoroborate (LiBF$_4$), etc.

The content of the electrolyte salt in the solvent is preferably 0.5 mol/kg or more and 2.5 mol/kg or less. This is because high ionic conductivity is achieved.

[Method of Producing Laminate Film Type Secondary Battery]

In the beginning, a positive electrode is produced with the above positive electrode material. A positive electrode mixture is first created by mixing the positive electrode active material with as necessary the positive electrode binding agent, the positive electrode conductive assistant agent, and other materials, and then dispersed in an organic solvent to form slurry of the positive-electrode mixture. Subsequently, the mixture slurry is applied to a positive electrode current collector with a coating apparatus such as a die coater having a die head or a knife roll, and dried by hot air to obtain a positive electrode active material layer. The positive electrode active material layer is finally compressed with, for example, a roll press. In this event, heating may be performed, and the compression may be repeated multiple times.

Next, a negative electrode active material layer is formed on a negative electrode current collector to produce a negative electrode through the same procedure as in the above production of the negative electrode 10 for a lithium-ion secondary battery.

In producing the positive electrode and the negative electrode, the active material layers are formed on both faces of the positive and negative electrode current collectors. In this event, in both the electrodes, the length of these active material layers formed on the faces may differ from one another (see FIG. 1).

Then, an electrolytic solution is prepared. Subsequently, with ultrasonic welding or the like, the positive-electrode lead 32 is attached to the positive electrode current collector and the negative-electrode lead 33 is attached to the negative electrode current collector. Then, the positive and negative electrodes and the separator interposed therebetween are stacked or wound to produce the wound electrode body 31 and a protecting tape is stuck to the outermost circumference of the body. Next, the wound body is flattened. Subsequently, the film-shaped outer part 35 is folded in half to interpose the wound electrode body therebetween. The insulating portions of the outer parts are stuck to one another by heat sealing, thereby the wound electrode body is encapsulated with one direction being opened. Thereafter, the close-adhesion films are inserted between the outer parts and the positive- and negative-electrode leads. Then, the prepared electrolytic solution is introduced in a prescribed amount from the opened side to perform the impregnation of the electrolytic solution under a vacuum. After the impregnation, the opened side is stuck by vacuum heat sealing. In this manner, the laminate film type secondary battery 30 is successfully produced.

The inventive non-aqueous electrolyte secondary battery such as the laminate film type secondary battery 30 produced as described above preferably has a negative-electrode utilization ratio of 93% or more and 99% or less at charging and discharging. With the negative-electrode utilization ratio in the range of 93% or more, the first time charge efficiency is not lowered, and the battery capacity can be greatly improved. Meanwhile, with the negative-electrode utilization ratio in the range of 99% or less, Li is not precipitated, and the safety can be guaranteed.

EXAMPLE

Hereinafter, the present invention will be more specifically described by showing Examples of the present invention and Comparative Examples. However, the present invention is not limited to these Examples.

Example 1-1

The laminate film type secondary battery 30 shown in FIG. 3 was prepared by the following procedure.

The procedure began with the production of a positive electrode. A positive-electrode mixture was prepared by mixing 95 parts by mass of lithium-nickel-cobalt-aluminum complex oxide ($LiNi_{0.7}Co_{0.25}Al_{0.050}$) as a positive electrode active material, 2.5 parts by mass of a positive electrode conductive assistant agent (acetylene black), and 2.5 parts by mass of a positive electrode binding agent (polyvinylidene fluoride: PVDF). Then, the positive-electrode mixture was dispersed in an organic solvent (N-methyl-2-pyrrolidone: NMP) to form paste slurry. The slurry was subsequently applied to both surfaces of a positive electrode current collector with a coating apparatus having a die head and dried with a drying apparatus of hot-air type. The positive electrode current collector used here had a thickness of 15 μm. The resultant was finally compressed with a roll press.

Next, a negative electrode was produced. In the beginning, a silicon-based active material was produced as follows. A mixed raw material of metallic silicon and silicon dioxide (material to be vaporized) was placed in a reaction furnace and evaporated in an atmosphere with a vacuum degree of 10 Pa to deposit the evaporated material on an adsorption plate. The deposit was sufficiently cooled, then taken out, and pulverized with a ball mill. After particle diameter adjustment, thermal CVD was performed to coat the particles with a carbon coating. Subsequently, lithium was inserted into the silicon compound particles by the oxidation-reduction method to modify the silicon compound covered with the carbon coating. At first, the negative electrode active material particles were immersed into a solution (solution A) in which a lithium piece and an aromatic compound naphthalene were dissolved in tetrahydrofuran (hereinafter referred to as THF). This solution A had been prepared by: dissolving naphthalene in a THE solvent at a concentration of 0.2 mol/L; and then adding a lithium piece whose mass was 10 mass % of this mixture solution of THE and naphthalene. Additionally, when the negative electrode active material particles were immersed, the solution temperature was 20° C., and the immersion time was 20 hours. Thereafter, the negative electrode active material particles were collected by filtration. By the above-described treatment, lithium was inserted in the negative electrode active material particles.

The resulting silicon compound particles were heated under an argon atmosphere at 600° C. for 24 hours to stabilize the Li compound.

In this manner, the negative electrode active material particles (silicon-based active material particles) were modified. By the aforementioned process, negative electrode active material particles were prepared. Note that the carbon coverage was 3 mass %, and the negative electrode active material particles had a median diameter (based on volume, D50) of 6.7 μm.

The obtained negative electrode active material particles were subjected to XRD measurement, $^{29}$Si-NMR measurement, Raman spectrometry, and particle size distribution measurement.

The silicon-based active material prepared as described above was blended with a carbon-based active material in a mass ratio of 2:8 to prepare a negative electrode active material. The carbon-based active material used herein was a mixture in which artificial graphite and natural graphite coated with a pitch layer were mixed in a mass ratio of 5:5. Additionally, the carbon-based active material had a median diameter of 20 μm.

Next, the prepared negative electrode active material, conductive assistant agent-1 (carbon nanotube, CNT), conductive assistant agent-2 (carbon fine particles with a median diameter of about 50 nm), styrene-butadiene rubber (styrene-butadiene copolymer; hereinafter, referred to as SBR), and carboxymethyl cellulose (hereinafter, referred to as CMC) were mixed in a dry mass ratio of 92.5:1:1:2.5:3. This was then diluted with pure water to form negative electrode mixture slurry. Incidentally, the foregoing SBR and CMC were negative electrode binders (negative electrode binding agents). In this event, to measure the stability of the negative-electrode mixture slurry, 30 g of the prepared negative-electrode mixture slurry was taken out separately from the remaining slurry for producing a secondary battery, and stored at 20° C. to observe the gas generation status after the preparation of the negative-electrode mixture slurry.

As a negative electrode current collector, an electrolytic copper foil (thickness: 15 μm) was used. Finally, the negative-electrode mixture slurry was applied onto the negative electrode current collector, and dried at 100° C. for 1 hour in a vacuum atmosphere. After drying, the negative electrode had a deposited amount of a negative electrode active material layer per unit area at one side (also referred to as an area density) of 5 mg/cm².

Next, solvents of fluoroethylene carbonate (FEC), ethylene carbonate (EC), and diethyl carbonate (DEC) were mixed, followed by dissolving electrolyte salt (lithium hexafluorophosphate: $LiPF_6$) to prepare an electrolytic solution. In this case, the solvent composition was set to FEC:EC:DEC=1:2:7 in a volume ratio, and the content of the electrolyte salt was set to 1.0 mol/kg based on the solvents. Further, vinylene carbonate (VC) was added in an amount of 1.5 mass % to the obtained electrolytic solution.

Then, a secondary battery was assembled as follows. First, an aluminum lead was attached to one end of the positive electrode current collector by ultrasonic welding, and a nickel lead was welded to one end of the negative electrode current collector. Subsequently, the positive electrode, a separator, the negative electrode, and a separator were laminated in this order, and wound in the longitudinal direction to produce a wound electrode body. The end of the winding portion was fixed with a PET protecting tape. The separator used herein was a 12-μm laminate film in which a film mainly composed of porous polyethylene was sandwiched by films mainly composed of porous polypropylene. Thereafter, the electrode body was put between outer parts, and then peripheries excluding one side were hot melted, and thereby the electrode body was stored in the outer parts. As the outer part, an aluminum laminate film was used in which a nylon film, an aluminum foil, and a polypropylene film were laminated. Then, the prepared electrolytic solution was introduced from the opening to perform the impregnation under a vacuum atmosphere. The opening was then stuck by heat sealing.

The cycle characteristics and first time charge-discharge characteristics of the secondary battery thus prepared were evaluated.

The cycle characteristics were investigated in the following manner. First, two cycles of charging and discharging were performed at 0.2 C under an atmosphere of 25° C. to stabilize the battery, and the discharge capacity in the second cycle was measured. Next, charging and discharging were repeated until the total number of cycles reached 299 cycles and the discharge capacity was measured every cycle. Finally, a capacity retention rate (hereinafter, also simply referred to as retention rate) was calculated by dividing the discharge capacity in the 300th cycle, which was obtained by charging and discharging at 0.2 C, by the discharge capacity in the second cycle. In the normal cycle, that is, in the cycles from the third cycle to 299th cycle, the charging and discharging were performed at 0.7 C in charging and at 0.5 C in discharging.

In investigating the first time charge-discharge characteristics, the first-time efficiency (hereinafter may also be referred to as initial efficiency) was calculated. The initial efficiency was calculated from the equation shown by: initial efficiency (%)=(first-time discharge capacity/first-time charge capacity)×100. The atmospheric temperature was the same as that in investigating the cycle characteristics. Additionally, this initial efficiency was such a calculated efficiency that the discharge capacity reached 1.2 V.

Examples 1-2 to 1-11, Comparative Examples 1-1, 1-2

Secondary batteries were prepared under the same conditions as in Example 1-1, except that the kind of lithium silicate to be incorporated inside the silicon compound particles and the intensity ratios Ib/Ia and Ic/Ia were changed as shown in Table 1. The cycle characteristics and first-time efficiency were then evaluated. The Li doing amount was altered to change the kind of lithium silicate and adjust the intensity ratios.

Table 1 shows the evaluation results of Examples 1-1 to 1-11 and Comparative Examples 1-1, 1-2.

TABLE 1

SiOx (x = 1), carbon coverage: 3 mass %, D50 = 6.7 μm, modification method: oxidation-reduction method

| | Li compound | Ib/Ia | Ic/Ia | Gas generation | First-time efficiency (%) 1.2 V condition | Cycle retention rate (%) 300th cycle condition |
|---|---|---|---|---|---|---|
| Example 1-1 | Li2SiO3, Li2Si2O5 | 1.5 | 2 | >7 days | 88.6% | 86.0% |
| Example 1-2 | Li2Si2O5 | 0 | 1.5 | >7 days | 81.2% | 85.8% |
| Example 1-3 | Li2SiO3, Li2Si2O5 | 0 | 2 | >7 days | 82.4% | 85.9% |
| Example 1-4 | Li2SiO3, Li2Si2O5 | 0.3 | 3.1 | >7 days | 83.9% | 86.2% |
| Example 1-5 | Li2SiO3, Li2Si2O5 | 0.2 | 6 | >7 days | 85.1% | 85.9% |
| Example 1-6 | Li2SiO3, Li2Si2O5 | 0.2 | 5.1 | >7 days | 87.5% | 86.0% |
| Example 1-7 | Li2SiO3, Li2Si2O5 | 0.4 | 3.7 | >7 days | 87.9% | 86.0% |
| Example 1-8 | Li2SiO3, Li2Si2O5 | 2.1 | 0.4 | >7 days | 89.1% | 86.4% |
| Example 1-9 | Li2SiO3, Li2Si2O5 | 3.3 | 0.2 | >7 days | 90.7% | 86.8% |
| Example 1-10 | Li2SiO3, Li2Si2O5 | 4 | 0 | >7 days | 90.6% | 86.9% |
| Example 1-11 | Li2SiO3 | 4.8 | 0.1 | >7 days | 91.0% | 87.0% |
| Comparative Example 1-1 | Li2SiO3 | 6.1 | 0.1 | 1 day | — | — |
| Comparative Example 1-2 | Li2SiO3, Li2Si2O5 | 6.4 | 6.5 | 3 days | 72.0% | 78.0% |

As shown in Table 1, when the intensity ratio Ib/Ia of the silicon compound shown by SiOx exceeded 4.8 (Comparative Examples 1-1, 1-2), the slurry stability was not attained, and it was impossible to produce an electrode. In contrast, when the intensity ratio Ib/Ia was 4.8 or less (Examples 1-1 to 1-11), the slurry stability was attained without problem, and favorable battery characteristics were obtained. Meanwhile, when the intensity ratio Ic/Ia exceeded 6 (Comparative Example 1-2), significant decreases in the battery characteristics were observed. The poor battery characteristics were presumably as a result of disproportionation reaction of SiO which proceeded due to increased XRD peak intensity of the Li silicate. On the other hand, when the intensity ratio Ib/Ia was 4.8 or less and the intensity ratio Ic/Ia was 6 or less, favorable battery characteristics were obtained.

Examples 2-1 to 2-4, Comparative Examples 2-1, 2-2

Secondary batteries were produced as in Example 1-1, except for adjusting the oxygen amount in the bulk of the silicon compound. In these events, the oxygen amount was adjusted by changing the heating temperature or the ratio of metallic silicon and silicon dioxide in the raw material of the silicon compound.

Further, the gas generation status, cycle characteristics, and first-time efficiency were evaluated under the same conditions as in Example 1-1. Each "x" value of the silicon compound shown by $SiO_x$ in Examples 1-1, 2-1 to 2-4, and Comparative Examples 2-1, 2-2 is shown in Table 2.

TABLE 2

SiOx, carbon coverage: 3 mass %, D50 = 6.7 μm, modification method: oxidation-reduction method, Li2Si2O5, Li2SiO3, XRD peak intensity ratios: Ib/Ia = 1.5, Ic/Ia = 2

| | SiOx x = | Gas generation | First-time efficiency (%) | Cycle retention rate (%) 300th 1.2 V cycle condition |
|---|---|---|---|---|
| Example 1-1 | 1 | >7 days | 88.6% | 86.0% |
| Comparative Example 2-1 | 0.3 | 1 day | 78.1% | 64.0% |
| Example 2-1 | 0.5 | >7 days | 89.7% | 86.4% |
| Example 2-2 | 0.7 | >7 days | 89.0% | 86.0% |
| Example 2-3 | 1.2 | >7 days | 88.7% | 86.1% |
| Example 2-4 | 1.6 | >7 days | 88.7% | 85.8% |
| Comparative Example 2-2 | 1.8 | >7 days | — | — |

As shown in Table 2, the battery characteristics were lowered when the value of "x" in the silicon compound shown by SiOx was departed from the range (Examples 1-1, 2-1 to 2-4) of 0.5≤x≤1.6. For example, when oxygen was insufficient (x=0.3) as shown in Comparative Example 2-1, the slurry stability was lowered, and the battery characteristics were significantly lowered. Meanwhile, when the oxygen amount was large (x=1.8) as shown in Comparative Example 2-2, the electric conductivity was lowered, and the capacity of the silicon oxide was not substantially exhibited. Hence, the evaluation was terminated.

Examples 3-1 to 3-6

Secondary batteries were produced as in Example 1-1, except for adjusting, in $^{29}$Si-NMR, the half-value width of a peak around −75 ppm (within the region of −70 to −80 ppm), the half-value width of a peak around −93 ppm (within the region of −85 to −100 ppm), and the peak intensity ratio. These were carried out by changing the heating temperature (the temperature during the heat treatment after Li doping).

Further, the gas generation status, cycle characteristics, and first-time efficiency were evaluated under the same conditions as in Example 1-1. Table 3 shows the results of Examples 1-1, 3-1 to 3-6.

TABLE 3

SiOx (x = 1), carbon coverage: 3 mass %, D50 = 6.7 μm, modification method: oxidation-reduction method, Li2Si2O5, Li2SiO3, XRD peak intensity ratios: Ib/Ia = 1.5, Ic/Ia = 2

| | Half-value width (ppm) around −75 ppm in 29Si-NMR | Half-value width (ppm) around −93 ppm in 29Si-NMR | 29Si-NMR peak intensity ratio Ik/Ij | Gas generation | First-time efficiency (%) 1.2 V condition | Cycle retention rate (%) 300th cycle condition |
|---|---|---|---|---|---|---|
| Example 1-1 | 1 | 1.2 | 0.20 | >7 days | 88.6% | 86.0% |
| Example 3-1 | 1.5 | 0.8 | 0.26 | >7 days | 89.0% | 85.7% |
| Example 3-2 | 1.6 | 0.51 | 0.32 | >7 days | 89.1% | 84.7% |
| Example 3-3 | 0.9 | — | 0.07 | >7 days | 89.4% | 85.8% |
| Example 3-4 | — | 1.5 | 0.26 | >7 days | 87.9% | 85.9% |
| Example 3-5 | — | 1.7 | 0.29 | >7 days | 87.6% | 86.1% |
| Example 3-6 | — | 1.8 | 0.31 | >7 days | 84.8% | 86.1% |

When the half-value width of the peak around −75 ppm (in the region of −70 to −80 ppm) was 1.5 ppm or less in $^{29}$Si-NMR, the capacity retention rate in the 300th cycle was further improved. Additionally, when the peak half-value width of the peak around −93 ppm (in the region of −85 to −100 ppm) was 1.7 ppm or less in $^{29}$Si-NMR, the first-time efficiency was further improved. These are presumably because each peak is derived from highly ordered silicate. Further, both the initial efficiency and the capacity retention rate were improved (Examples 1-1, 3-1, 3-3, 3-4, 3-5) when the peak intensity ratio Ik/Ij satisfied Ik/Ij≤0.3, where Ij represents the peak intensity of the peak around −75 ppm (in the region of −70 to −80 ppm) given as a chemical shift value, and Ik represents the peak intensity of the peak around −93 ppm (in the region of −85 to −100 ppm.

Examples 4-1 to 4-6

Secondary batteries were produced as in Example 1-1, except for adjusting the amount of carbon coating on the silicon compound particles.

Further, the gas generation status, cycle characteristics, and first-time efficiency were evaluated under the same conditions as in Example 1-1. Table 4 shows the results of Examples 1-1, 4-1 to 4-6.

TABLE 4

SiOx (x = 1), D50 = 6.7 μm, modification method: oxidation-reduction method, Li2Si2O5, Li2SiO3, XRD peak intensity ratios: Ib/Ia = 1.5, Ic/Ia = 2 half-value width of peak around −75 ppm in 29Si-NMR: 1.0 ppm half-value width of peak around −93 ppm in 29Si-NMR: 1.2 ppm, intensity ratio: 0.2

| | Carbon coating amount (mass %) | Gas generation | First-time efficiency (%) 1.2 V condition | Cycle retention rate (%) 300th cycle condition |
|---|---|---|---|---|
| Example 1-1 | 3 mass % | >7 days | 88.6% | 86.0% |
| Example 4-1 | 0.2 mass % | >7 days | 88.4% | 85.0% |

TABLE 4-continued

SiOx (x = 1), D50 = 6.7 μm, modification method: oxidation-
reduction method,
Li2Si2O5, Li2SiO3, XRD peak intensity ratios: Ib/Ia = 1.5,
Ic/Ia = 2 half-value
width of peak around −75 ppm in 29Si-NMR: 1.0 ppm
half-value width of peak around −93 ppm in 29Si-NMR: 1.2
ppm, intensity ratio: 0.2

|  | Carbon coating amount (mass %) | Gas generation | First-time efficiency (%) 1.2 V condition | Cycle retention rate (%) 300th cycle condition |
|---|---|---|---|---|
| Example 4-2 | 0.5 mass % | >7 days | 88.5% | 85.3% |
| Example 4-3 | 1 mass % | >7 days | 88.6% | 85.9% |
| Example 4-4 | 5 mass % | >7 days | 88.8% | 86.0% |
| Example 4-5 | 15 mass % | >7 days | 88.9% | 86.1% |
| Example 4-6 | 20 mass % | >7 days | 88.9% | 86.1% |

When the carbon coating amount was 0.2 mass % as in Example 4-1, there was no problem with the slurry stability, but decreases in battery characteristics were observed in comparison with Examples in which the carbon coating amount was 0.5 mass % or more and 15 mass % or less such as in Examples 1-1, 4-2 to 4-5. This is presumably because the smaller carbon coating amount in Example 4-1 resulted in insufficient conduction path during charging and discharging. Meanwhile, when the carbon coating amount was larger than the carbon coating amount of 15 mass %, the battery characteristics per se were not problematic (Example 4-6), but the capacity per unit weight was lowered. Thus, to have the merit of the silicon-based active material, the carbon coating amount is preferably 15 mass % or less.

Examples 5-1 to 5-6

Secondary batteries were produced as in Example 1-1, except for adjusting the intensity ratio Id/Ig of the D band peak and the G band peak obtained by Raman spectrometry. The intensity ratio Id/Ig can be adjusted by controlling the thermal CVD conditions (such as gas type, pressure, temperature, time).

Further, the gas generation status, cycle characteristics, and first-time efficiency were evaluated under the same conditions as in Example 1-1. Table 5 shows the results of Examples 1-1, 5-1 to 5-6.

TABLE 5

SiOx (x = 1), carbon coating amount: 3 mass %, D50 = 6.7 μm,
modification method: oxidation-reduction method,
Li2Si2O5, Li2SiO3, XRD peak intensity ratios:
Ib/Ia = 1.5, Ic/Ia = 2
half-value width of peak around −75 ppm in
29Si-NMR: 1.0 ppm
half-value width of peak around −93 ppm in 29Si-NMR: 1.2
ppm, intensity ratio: 0.2

|  | Id/Ig | Gas generation | First-time efficiency (%) 1.2 V condition | Cycle retention rate (%) 300th cycle condition |
|---|---|---|---|---|
| Example 1-1 | 0.83 | >7 days | 88.6% | 86.0% |
| Example 5-1 | 0.38 | >7 days | 86.1% | 85.4% |
| Example 5-2 | 0.41 | >7 days | 88.4% | 85.6% |
| Example 5-3 | 0.62 | >7 days | 88.5% | 85.9% |
| Example 5-4 | 0.88 | >7 days | 88.7% | 86.0% |
| Example 5-5 | 0.98 | >7 days | 88.9% | 86.0% |
| Example 5-6 | 1.06 | >7 days | 86.4% | 84.8% |

When the intensity ratio Id/Ig is smaller than 0.4 (Example 5-1), $sp^2$ carbon as the G band peak component is increased, and the first-time efficiency tends to be lower. Thus, the intensity ratio Id/Ig is preferably 0.4 or more. Meanwhile, when the intensity ratio Id/Ig is large (Example 5-6), the following trends exist: the electric conductivity of the surface carbon is lower than that when Id/Ig was 1 or less, and the first-time efficiency and the long-period cycle are lower than those when Id/Ig was 1 or less. Thus, to avoid these, Id/Ig is preferably 1 or less.

Examples 6-1 to 6-6

Secondary batteries were produced as in Example 1-1, except for adjusting the intensity ratio ISi/Ig of the Si-derived peak and the G band peak obtained by Raman spectrometry. The intensity ratio ISi/Ig can be adjusted by controlling the thermal CVD conditions (such as gas type, pressure, temperature, time).

Further, the gas generation status, cycle characteristics, and first-time efficiency were evaluated under the same conditions as in Example 1-1. Table 6 shows the results of Examples 1-1, 6-1 to 6-6.

TABLE 6

SiOx (x = 1), carbon coating amount: 3 mass %, D50 = 6.7 μm,
modification method: oxidation-reduction method,
Li2Si2O5, Li2SiO3, XRD peak intensity ratios: Ib/Ia = 1.5,
Ic/Ia = 2
half-value width of peak around −75 ppm in
29Si-NMR: 1.0 ppm
half-value width of peak around −93 ppm in 29Si-NMR: 1.2
ppm, intensity ratio: 0.2
Raman intensity ratio: Id/Ig = 0.83

|  | ISi/Ig | Gas generation | First-time efficiency (%) 1.2 V condition | Cycle retention rate (%) 300th cycle condition |
|---|---|---|---|---|
| Example 1-1 | 0.62 | >7 days | 88.6% | 86.0% |
| Example 6-1 | 0.08 | >7 days | 87.2% | 86.4% |
| Example 6-2 | 0.25 | >7 days | 87.5% | 86.3% |
| Example 6-3 | 0.57 | >7 days | 88.4% | 86.1% |
| Example 6-4 | 0.78 | >7 days | 88.7% | 86.0% |
| Example 6-5 | 0.95 | >7 days | 88.9% | 85.9% |
| Example 6-6 | 1.10 | 7 days | 88.5% | 84.6% |

When intensity ratio ISi/Ig was larger than 1, the silicon-based oxide was exposed on larger area, and the slurry stability was slightly lowered. Meanwhile, when the intensity ratio ISi/Ig is within the range of 0≤ISi/Ig≤1, there is no problem with the slurry stability, and favorable battery characteristics are also obtained.

Examples 7-1 to 7-8

Secondary batteries were produced as in Example 1-1, except for changing the median diameter of the silicon compound particles.

Further, the gas generation status, cycle characteristics, and first-time efficiency were evaluated under the same conditions as in Example 1-1. Table 7 shows the results of Examples 1-1, 7-1 to 7-8.

TABLE 7

SiOx (x = 1), carbon coating amount: 3 mass %, D50 = 6.7 μm,
modification method: oxidation-reduction method,
Li2Si2O5, Li2SiO3, XRD peak intensity ratios: Ib/Ia = 1.5,
Ic/Ia = 2
half-value width of peak around −75 ppm in 29Si-NMR: 1.0 ppm
half-value width of peak around −93 ppm in 29Si-NMR: 1.2 ppm, intensity ratio: 0.2
Raman intensity ratios: Id/Ig = 0.83, Isi/Ig = 0.62

| | D50 (μm) | Gas generation | First-time efficiency (%) | Cycle retention rate (%) 300th 1.2 V cycle condition |
|---|---|---|---|---|
| Example 1-1 | 6.7 | >7 days | 88.6% | 86.0% |
| Example 7-1 | 0.1 | >7 days | 86.0% | 83.2% |
| Example 7-2 | 0.5 | >7 days | 88.1% | 84.8% |
| Example 7-3 | 1 | >7 days | 88.2% | 85.1% |
| Example 7-4 | 3 | >7 days | 88.2% | 85.8% |
| Example 7-5 | 5 | >7 days | 88.5% | 86.0% |
| Example 7-6 | 10 | >7 days | 88.6% | 87.2% |
| Example 7-7 | 15 | >7 days | 88.6% | 87.0% |
| Example 7-8 | 20 | >7 days | 88.0% | 84.7% |

When the silicon compound median diameter was 0.5 μm or more, the initial efficiency and retention rate were further improved. This is presumably because the surface area per mass of the silicon compound particles was not so large, and side reaction was suppressed. Meanwhile, when the median diameter is 20 μm or less, the particles are hard to break upon charging, and SEI (solid electrolyte interface) due to new surface is hardly formed upon charging or discharging. Thus, reversible Li loss is successfully suppressed. Furthermore, when the median diameter of the silicon compound particles is 20 μm or less, the expansion amount of the silicon compound particles upon charging is not so large, making it possible to prevent physical and electrical destruction of the negative electrode active material layer due to expansion.

It should be noted that the present invention is not limited to the above-described embodiments. The embodiments are just examples, and any examples that substantially have the same feature and demonstrate the same functions and effects as those in the technical concept disclosed in claims of the present invention are included in the technical scope of the present invention.

The invention claimed is:

1. A negative electrode active material for a non-aqueous electrolyte secondary battery, containing negative electrode active material particles which comprise particles of a silicon compound ($SiO_x$: 0.5≤x≤1.6), wherein
   the negative electrode active material particles are at least partially coated with a carbon material, and comprise $Li_2SiO_{3Z}$ and when Ic/Ia is >0, $Li_2Si_2O_5$, and
   the negative electrode active material particles satisfy 1.5≤Ib/Ia≤4.8 and Ic/Ia≤2.0 in an X-ray diffraction measurement using a Cu-Kα line, where
   Ia represents an intensity of a peak around 2θ=28.4° attributable to Si obtained by the X-ray diffraction,
   Ib represents a peak intensity of a peak attributable to $Li_2SiO_3$ obtained by the X-ray diffraction, and
   Ic represents a peak intensity of a peak attributable to $Li_2Si_2O_5$ obtained by the X-ray diffraction.

2. The negative electrode active material for a non-aqueous electrolyte secondary battery according to claim 1, wherein
   the peak attributable to $Li_2SiO_3$ has a half-value width of 1.0° or less, and
   the peak attributable to $Li_2Si_2O_5$ has a half-value width of 1.6° or less.

3. The negative electrode active material for a non-aqueous electrolyte secondary battery according to claim 1, wherein the negative electrode active material particles have at least one or more peaks in regions given as chemical shift values of −70 to −80 ppm and −85 to −100 ppm, which are obtained from a $^{29}$Si-MAS-NMR spectrum of the negative electrode active material particles.

4. The negative electrode active material for a non-aqueous electrolyte secondary battery according to claim 2, wherein the negative electrode active material particles have at least one or more peaks in regions given as chemical shift values of −70 to −80 ppm and −85 to −100 ppm, which are obtained from a $^{29}$Si-MAS-NMR spectrum of the negative electrode active material particles.

5. The negative electrode active material for a non-aqueous electrolyte secondary battery according to claim 3, wherein
   in the $^{29}$Si-MAS-NMR spectrum of the negative electrode active material particles,
   the peak obtained in the region, as the chemical shift value, of −70 to −80 ppm has a peak half-value width of 1.5 ppm or less, and
   the peak obtained in the region of −85 to −100 ppm has a peak half-value width of 1.7 ppm or less.

6. The negative electrode active material for a non-aqueous electrolyte secondary battery according to claim 4, wherein
   in the $^{29}$Si-MAS-NMR spectrum of the negative electrode active material particles,
   the peak obtained in the region, as the chemical shift value, of −70 to −80 ppm has a peak half-value width of 1.5 ppm or less, and
   the peak obtained in the region of −85 to −100 ppm has a peak half-value width of 1.7 ppm or less.

7. The negative electrode active material for a non-aqueous electrolyte secondary battery according to claim 3, wherein
   a peak intensity ratio Ik/Ij obtained from the $^{29}$Si-MAS-NMR spectrum of the negative electrode active material particles satisfies Ik/Ij≤0.3, where
   Ij represents a peak intensity of the peak obtained in the region as the chemical shift value of −70 to −80 ppm, and
   Ik represents a peak intensity of the peak obtained in the region as the chemical shift value of −85 to −100 ppm.

8. The negative electrode active material for a non-aqueous electrolyte secondary battery according to claim 4, wherein
a peak intensity ratio Ik/Ij obtained from the $^{29}$Si-MAS-NMR spectrum of the negative electrode active material particles satisfies Ik/Ij≤0.3, where
Ij represents a peak intensity of the peak obtained in the region as the chemical shift value of −70 to −80 ppm, and
Ik represents a peak intensity of the peak obtained in the region as the chemical shift value of −85 to −100 ppm.

9. The negative electrode active material for a non-aqueous electrolyte secondary battery according to claim 5, wherein
a peak intensity ratio Ik/Ij obtained from the $^{29}$Si-MAS-NMR spectrum of the negative electrode active material particles satisfies Ik/Ij≤0.3, where
Ij represents a peak intensity of the peak obtained in the region as the chemical shift value of −70 to −80 ppm, and
Ik represents a peak intensity of the peak obtained in the region as the chemical shift value of −85 to −100 ppm.

10. The negative electrode active material for a non-aqueous electrolyte secondary battery according to claim 6, wherein
a peak intensity ratio Ik/Ij obtained from the $^{29}$Si-MAS-NMR spectrum of the negative electrode active material particles satisfies Ik/Ij≤0.3, where
Ij represents a peak intensity of the peak obtained in the region as the chemical shift value of −70 to −80 ppm, and
Ik represents a peak intensity of the peak obtained in the region as the chemical shift value of −85 to −100 ppm.

11. The negative electrode active material for a non-aqueous electrolyte secondary battery according to claim 1, wherein the negative electrode active material particles are coated with the carbon material in an amount of 0.5 mass % or more and 15 mass % or less relative to a total of the silicon compound particles and the carbon material.

12. The negative electrode active material for a non-aqueous electrolyte secondary battery according to claim 1, wherein an intensity ratio Id/Ig of a D band and a G band in Raman spectrometry of the negative electrode active material particles satisfies 0.4≤Id/Ig≤1.

13. The negative electrode active material for a non-aqueous electrolyte secondary battery according to claim 1, wherein an intensity ratio ISi/Ig of a Si peak intensity and a G band in Raman spectrometry of the negative electrode active material particles satisfies 0≤ISi/Ig≤1.

14. The negative electrode active material for a non-aqueous electrolyte secondary battery according to claim 1, wherein the silicon compound particles have a median diameter of 0.5 μm or more and 20 μm or less.

15. A non-aqueous electrolyte secondary battery comprising the negative electrode active material for a non-aqueous electrolyte secondary battery according to claim 1.

16. A method for producing a negative electrode material for a non-aqueous electrolyte secondary battery containing negative electrode active material particles, the method comprising steps of:
preparing silicon compound particles each containing a silicon compound (SiO$_x$: 0.5≤x≤1.6);
coating at least part of the silicon compound particles with a carbon material;
inserting Li into the silicon compound particles to incorporate Li$_2$SiO$_3$, and when Ic/Ia is >0, Li$_2$Si$_2$O$_5$, into the silicon compound particles so as to prepare the negative electrode active material particles; and
further selecting, from the prepared negative electrode active material particles subjected to an X-ray diffraction measurement using a Cu-Kα line, such negative electrode active material particles satisfying 1.5≤Ib/Ia≤4.8 and Ic/Ia≤2.0, where
Ia represents an intensity of a peak around 2θ=28.4° attributable to Si obtained by the X-ray diffraction,
Ib represents a peak intensity of a peak attributable to Li$_2$SiO$_3$ obtained by the X-ray diffraction, and
Ic represents a peak intensity of a peak attributable to Li$_2$Si$_2$O$_5$ obtained by the X-ray diffraction,
wherein the selected negative electrode active material particles are used to produce a negative electrode material for a non-aqueous electrolyte secondary battery.

* * * * *